United States Patent
Siddiqui et al.

(10) Patent No.: US 9,979,804 B2
(45) Date of Patent: May 22, 2018

(54) MOVEABLE HOUSING OF A MOBILE COMMUNICATIONS DEVICE

(71) Applicant: Microsoft Technology Licensing, LLC, Redmond, WA (US)

(72) Inventors: Kabir Siddiqui, Sammamish, WA (US); Quintin R. Morris, Issaquah, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days. days.

(21) Appl. No.: 15/359,522

(22) Filed: Nov. 22, 2016

(65) Prior Publication Data

US 2017/0078459 A1    Mar. 16, 2017

Related U.S. Application Data

(60) Division of application No. 14/807,584, filed on Jul. 23, 2015, which is a continuation of application No.
(Continued)

(51) Int. Cl.
*H04M 1/02*     (2006.01)
*G06F 1/16*     (2006.01)
*H04W 88/02*    (2009.01)

(52) U.S. Cl.
CPC ........ *H04M 1/0212* (2013.01); *G06F 1/1622* (2013.01); *G06F 1/1624* (2013.01);
(Continued)

(58) Field of Classification Search
CPC ............. H04M 1/0206; H04M 1/0208; H04M 1/0235; H04M 1/0237; H04M 1/0239;
(Continued)

(56) References Cited

U.S. PATENT DOCUMENTS 6,774,888 B1    8/2004   Genduso
6,973,186 B2   12/2005   Shin
(Continued)

FOREIGN PATENT DOCUMENTS

CN    101147383    3/2008
CN    201191955    2/2009
(Continued)

OTHER PUBLICATIONS

"Droid by Motorola", Retrieved from: <http://www.motorola.com/Consumers/US-EN/Consumer-Product-and-Services/Mobile-Phones/ci.Motorola-DROID-US-EN.vertical> on Jan. 29, 2010, 2 pages.
(Continued)

*Primary Examiner* — Allahyar Kasraian

(57) ABSTRACT

Mobile communications devices having moveable housings are described. In an implementation, a mobile communications device includes a first housing and a second housing. At least one of the first or second housings are moveable between a first configuration in which the first housing substantially covers the second housing so that an outer surface of the second housing is covered and an outer surface of the first housing is viewable, and a second configuration in which said outer surface of the second housing is exposed and positioned such that said outer surface of the second housing is positioned in a substantially similar plane to that of said outer surface of the first housing.

20 Claims, 8 Drawing Sheets

Related U.S. Application Data

12/701,251, filed on Feb. 5, 2010, now Pat. No. 9,154,592.

(52) U.S. Cl.
CPC ........ *G06F 1/1681* (2013.01); *H04M 1/0216* (2013.01); *H04M 1/0233* (2013.01); *H04M 1/0235* (2013.01); *H04M 1/0237* (2013.01); *H04M 1/0295* (2013.01); *H04M 1/0208* (2013.01); *H04M 1/0247* (2013.01); *H04W 88/02* (2013.01)

(58) Field of Classification Search
CPC ............. H04M 1/0214; H04M 1/0247; H04M 1/0241; H04M 1/0245
USPC .......................................... 455/575.1–575.4
See application file for complete search history.

(56) References Cited

U.S. PATENT DOCUMENTS

| | | | |
|---|---|---|---|
| 8,014,137 | B2 | 9/2011 | Rema Shanmugam et al. |
| 8,301,203 | B2 | 10/2012 | Watanabe |
| 8,630,085 | B2 | 1/2014 | Sawada |
| 9,154,592 | B2 | 10/2015 | Siddiqui et al. |
| 2007/0041773 | A1 | 2/2007 | Pirila et al. |
| 2007/0099453 | A1 | 5/2007 | Park |
| 2007/0243897 | A1 | 10/2007 | Maatta et al. |
| 2008/0167097 | A1 | 7/2008 | Ko |
| 2008/0299804 | A1* | 12/2008 | Ronkko ............ H04M 1/0233 439/142 |
| 2009/0061963 | A1 | 3/2009 | Miyaoka |
| 2009/0233660 | A1 | 9/2009 | Demuynck |
| 2009/0286573 | A1 | 11/2009 | Jang et al. |
| 2009/0286574 | A1 | 11/2009 | Kim et al. |
| 2010/0004036 | A1 | 1/2010 | Liu |
| 2010/0159993 | A1 | 6/2010 | Davidson et al. |
| 2010/0210311 | A1 | 8/2010 | Ahn et al. |
| 2010/0285845 | A1 | 11/2010 | Sawada et al. |
| 2010/0304793 | A1 | 12/2010 | Kim |
| 2010/0331059 | A1* | 12/2010 | Apgar ................ H04M 1/0227 455/575.1 |
| 2011/0007465 | A1* | 1/2011 | Naito ................. H04M 1/0237 361/679.01 |
| 2011/0105202 | A1* | 5/2011 | Kim ................... H04M 1/0233 455/575.1 |
| 2011/0195752 | A1 | 8/2011 | Siddiqui |
| 2015/0350394 | A1 | 12/2015 | Siddiqui et al. |

FOREIGN PATENT DOCUMENTS

| | | | |
|---|---|---|---|
| KR | 20100008424 | 1/2010 | |
| WO | WO-2009034907 | 3/2009 | |
| WO | WO-2009084583 | 7/2009 | |
| WO | WO 2009110454 A1 * | 9/2009 | .......... H04M 1/0237 |
| WO | WO-2011097069 | 8/2011 | |

OTHER PUBLICATIONS

"Final Office Action", U.S. Appl. No. 12/701,251, dated Feb. 21, 2013, 11 pages.
"Final Office Action", U.S. Appl. No. 12/701,251, dated Feb. 24, 2014, 17 pages.
"Final Office Action", U.S. Appl. No. 12/701,251, dated Mar. 12, 2015, 16 pages.
"Final Office Action", U.S. Appl. No. 14/807,584, dated Mar. 10, 2016, 16 pages.
"Foreign Notice of Allowance", CN Application No. 201180008360.0, dated Sep. 9, 2015, 4 pages.
"Foreign Office Action", CN Application No. 201180008360.0, dated Feb. 27, 2015, 12 pages.
"Foreign Office Action", CN Application No. 201180008360.0, dated Aug. 18, 2014, 13 Pages.
"Foreign Office Action", CN Application No. 201180008360.0, dated Dec. 3, 2013, 16 Pages.
"International Preliminary Report on Patentability", Application No. PCT/US2011/021599, dated Aug. 7, 2012, 5 pages.
"International Search Report and Written Opinion", Application No. PCT/US2011/021599, dated Sep. 7, 2011, 9 pages.
"Nokia N900", Retrieved from: <http://www.forum.nokia.com/devices/N900/> on Jan. 29, 2010, Aug. 27, 2009, 3 pages.
"Non-Final Office Action", U.S. Appl. No. 12/701,251, dated Sep. 18, 2013, 13 pages.
"Non-Final Office Action", U.S. Appl. No. 12/701,251, dated Oct. 8, 2014, 15 pages.
"Non-Final Office Action", U.S. Appl. No. 12/701,251, dated Sep. 17, 2012, 8 pages.
"Non-Final Office Action", U.S. Appl. No. 14/807,584, dated Oct. 2, 2015, 15 pages.
"Notice of Allowance", U.S. Appl. No. 12/701,251, dated Jun. 26, 2015, 8 pages.
"Samsung F700 Review", Retrieved from: <http://www.yourmobilephone.co.uk/samsung-f700/samsung-f700-review-exclusive-to-vodafone/> on Jan. 29, 2010, Nov. 25, 2007, 6 ppages.
Knowles,"The AT&T Tilt", Retrieved from : < http://www.thetechbrief.com/2007/11/09/the-at-t-tilt/> on Jan. 29, 2010, Nov. 9, 2007, 7 pages.

* cited by examiner

600

602
Move at least one of a first housing or a second housing of a mobile communications device to assume a first configuration

604
Move at least one of the first housing or the second housing of a mobile communications device to assume a second configuration

MOVEABLE HOUSING OF A MOBILE COMMUNICATIONS DEVICE

PRIORITY INFORMATION

This application is a divisional of U.S. application Ser. No. 14/807,584 entitled "Moveable Housing of a Mobile Communications Device" filed Jul. 23, 2015 which in turn is a continuation of and claims benefit of U.S. application Ser. No. 12/701,251 entitled "Moveable Housing of a Mobile Communications Device" filed Feb. 5, 2010, the content of which are incorporated by reference herein in their entirety.

BACKGROUND

Mobile communications devices (e.g., wireless phones) have become an integral part of everyday life. For example, a user traditionally used mobile communications devices to place and receive telephone calls when the user was away from a fixed communication device, e.g., a house or office telephone. In some instances, the mobile communications device became the primary device via which the user communicated with other users as the user became accustomed to the convenience and functionality of the device.

Further, the communication techniques that may be employed using a mobile communications device have increased, from voice communication to text messaging and emails. Accordingly, a wide variety of form factors have been employed by the mobile communications device to accommodate this functionality. Once such form factor involved a sliding keyboard and display such that the keyboard could be "hid" behind the display when not in use. However, this traditional form factor involved placement of the display at a significant distance from the keyboard so that a user could interact with the keyboard without interference from the display device. This placement could result in a variety of undesirable consequences, such as a smaller keyboard, increase in size of the mobile communications device, and so on.

SUMMARY

Mobile communications devices having moveable housings are described. In an implementation, a mobile communications device includes a first housing that includes a display device and a second housing that includes a keyboard. At least one of the first or second housings are moveable between a first configuration in which the first housing substantially covers the second housing so the keyboard is covered and the display device is viewable and a second configuration in which the keyboard is exposed and positioned such that an outer plane of the keyboard is positioned in a substantially similar plane to that of an outer surface of the display device.

In another implementation, a method includes moving at least one of a first housing or a second housing of a mobile communications device to assume a first configuration. The first housing includes a display device and the second housing includes a keyboard. In the first configuration, the display device is viewable, and the keyboard is covered. The method also includes moving at least one of the first housing or the second housing of the mobile communications device to assume a second configuration in which the keyboard is exposed and positioned such that an outer plane of the keyboard is positioned in a substantially similar plane to that of an outer surface of the display device and the display device is viewable.

In a further implementation, a mobile communications device includes a first housing that includes a display device and a second housing that includes a keyboard. The first and second housings are moveable between a first configuration in which the first housing substantially covers the second housing so the keyboard is covered and a second configuration in which the keyboard is exposed by sliding the first housing, which causes the second housing to be raised such that an outer plane of the keyboard is positioned in a substantially similar plane to that of an outer surface of the display device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
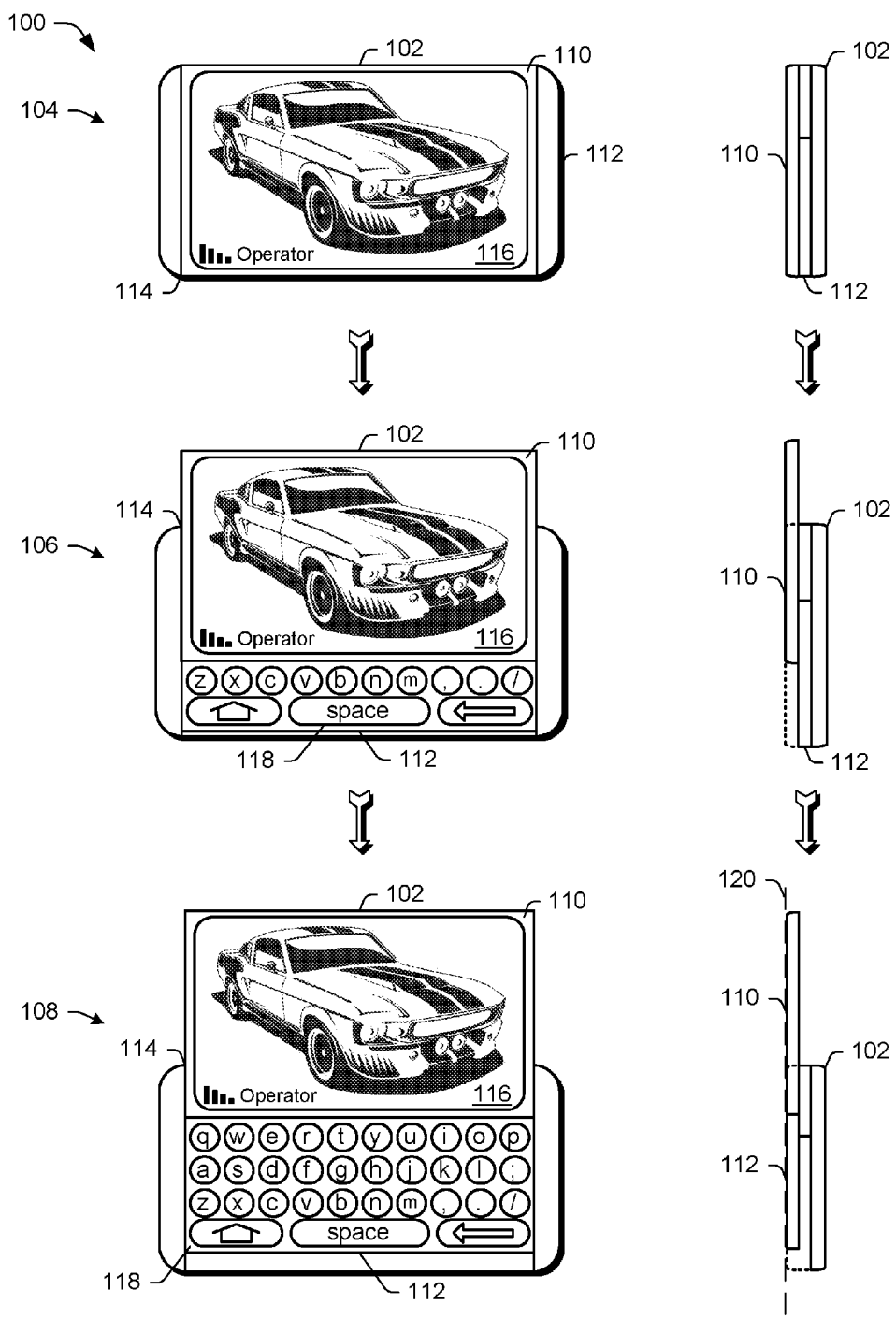
FIG. 1 is an illustration of an example implementation of an example mobile communications device in accordance with one or more embodiments of devices, features, and systems for mobile communications.

Users continually desire increased functionality from mobile communications devices, e.g., wireless phones, mobile messaging devices, calendaring devices, and so on. However, inclusion of this increased functionality in traditional mobile communications devices may make these devices more cumbersome and therefore less suitable to mobile applications as traditionally configured.

One traditional design that was developed to accommodate this functionality was a "slide type" device in which the keyboard slides under the display. However, when the keyboard is open in this traditional design, the keyboard is positioned in a plane that is different from the display device to facilitate the sliding of the display device. For example, the keyboard may be positioned significantly "lower" than the display device, e.g., equal to or greater than a height of the housing. Consequently, the top row of the keyboard in this traditional design was positioned at least a minimum distance from the display so that a user's fingers could press the keys of the keyboard without interference from the display. However, the size of the overall device may be increased and/or the size of the keys of the keyboard decreased to provide this distance, which resulted in a design of the device that was inefficient and cumbersome.

A mobile communications device is described having at least one moveable housing to position a keyboard and a display device in a substantially similar plane. For example, a first housing may include a display device that is slideable to expose a second housing having the keyboard. The sliding of the first housing having the display device in this example may cause the second housing having the keyboard to be raised through a linkage. In this way, the keyboard and the display device may be positioned in a substantially similar plane. This may enable the keyboard and the display device to be positioned closer as the bottom edge of the first housing that includes the display device will not interfere with the fingers of the user when typing. A variety of other examples are also contemplated (e.g., movement of the first housing to be positioned in the plane of the second housing having the keyboard), further discussion of which may be found in relation to the following sections.

In the following discussion, a variety of example implementations of a mobile communications device are shown. Additionally, a variety of different functionality that may be employed by the mobile communications device is described for each example, which may be implemented in that example as well as in other described examples. Accordingly, example implementations are illustrated of a few of a variety of contemplated implementations. Further, although a mobile communications device having one or more modules that are configured to provide telephonic functionality are described, a variety of other mobile communications devices are also contemplated, such as dedicated messaging devices, portable game devices, music players, and so on.

Example Implementations

FIG. 1 is an illustration of an example implementation 100 of a mobile communications device 102 in accordance with one or more embodiments of devices, features, and systems for mobile communications. The mobile communications device 102 is illustrated as assuming a plurality of configurations, examples of which include a first configuration 104, a second configuration 106, and a third configuration 108. Additionally, in each configuration the mobile communications device 102 is shown from a front view and a side view in left and right columns, respectively, in the example implementation of FIG. 1.

The mobile communications device 102 is further illustrated as including a first housing 110 and a second housing 112 that are connected via a slide 114 such that the first and second housings 110, 112 may move (e.g., slide) in relation to one another. The first housing 110 includes a display device 116 (e.g., a touchscreen) that may be used to output a variety of data, such as a caller identification (ID), information related to text messages as illustrated, email, multimedia messages, Internet browsing, game play, music, video and so on. The second housing 112 is illustrated as including a keyboard 118 that may be used to provide inputs to the mobile communications device 102. Although the keyboard 118 is illustrated as a QWERTY keyboard, a variety of other examples are also contemplated, such as a twelve key numeric pad.

Figure 5:
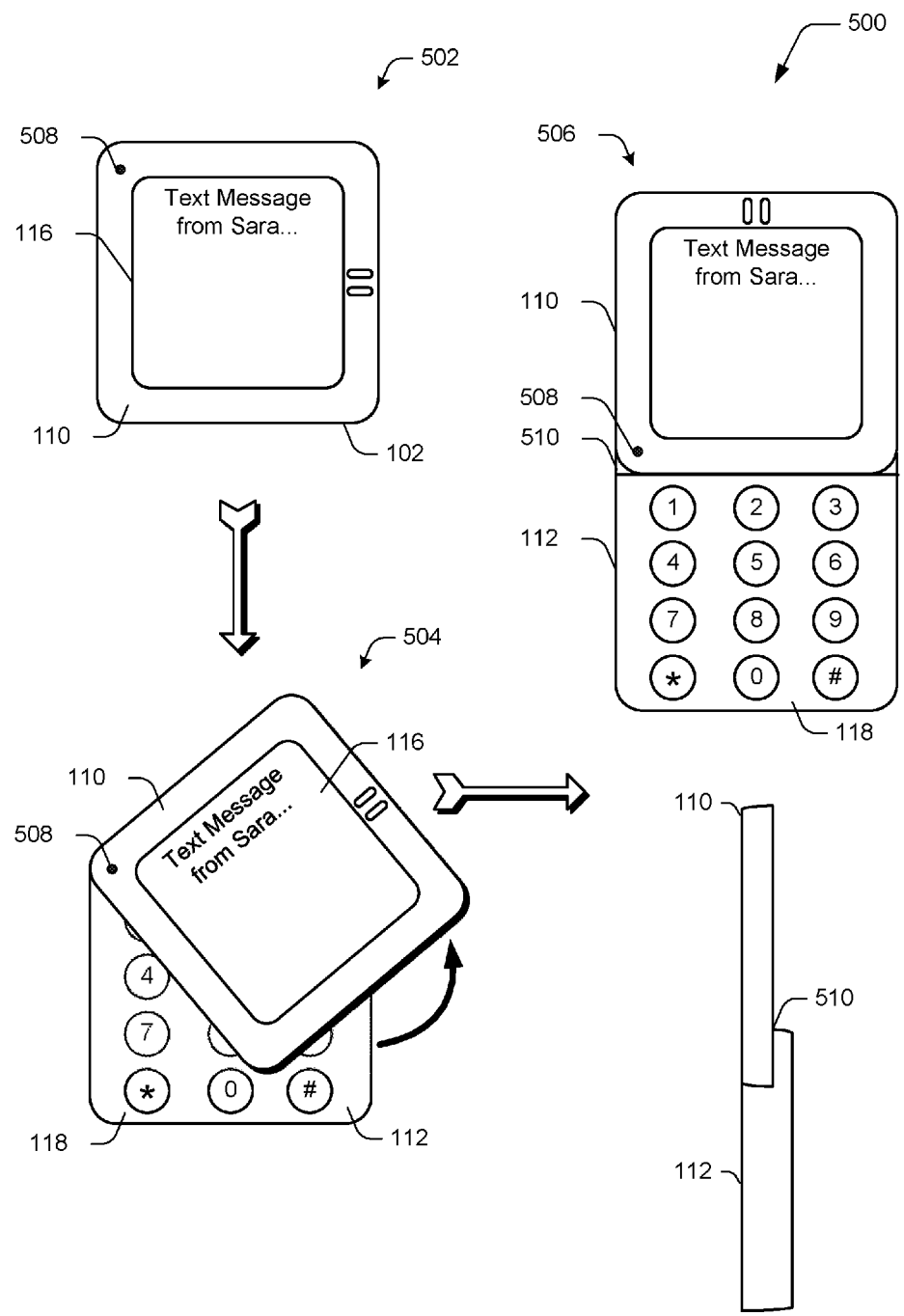

In the example shown in FIG. 1, the first and second housings 110, 112 of the mobile communications device 102 are rectangular. For example, a plane defined by an outer surface of the display device 116 may be parallel to a plane of the first housing 110 that approximates a rectangle in the first configuration 104. In another example, the width and height of the plane taken from the first housing that is parallel to the other surface of the display device 116 are approximately square (e.g., one-to-one so as to be equilateral rectilinear, an example of which is illustrated in FIG. 5). A variety of other examples are also contemplated.

In the first configuration 104, the mobile communications device 102 is closed such that the first housing 110 covers the second housing 112. Consequently, the keyboard 118 disposed on the second housing 112 is covered and thus is not available to receive inputs from a user of the mobile communications device 102. In an implementation, telephonic functionality is still available when the mobile communications device 102 is in the first configuration 104, e.g., to receive and answer a telephone call via interaction with the display device 116 or other buttons disposed either of the first and/or second housings 108, 110.

In the second configuration 106, the first housing 110 is moved (e.g., slid) "away" from the second housing 112 using the slide 114. In this example configuration, a portion of the keys of the keyboard 118 is exposed such that the exposed keys are available to receive inputs from a user. In another implementation, however, use of the keys of the keyboard 116 is restricted until the mobile communications device 106 assumes the open configuration illustrated in the third configuration 108 to help prevent inadvertent inputs. In an implementation, the planes of the first and second housings 110, 112 that are used to define the form factor are parallel to each other and positioned along a substantially similar plane, although other implementations are also contemplated.

In the third configuration 108, the first housing 110 is moved further "away" from the second housing 112 using the slide 114. In this example configuration, at least a majority of the keys of the keyboard 118 are exposed and are available to receive inputs from a user. Accordingly, the third configuration 108 may be considered an "open" configuration. In the illustrated implementation 100, the display device 116 remains viewable by a user in each configuration, examples of which are shown in the first, second, and third configurations 104, 106, 108.

As shown in the side views of the first, second, and third configurations 104, 106, 108, the second housing 112 that includes the keyboard 118 is "raised up" as the first housing 110 that includes display device 116 is slid. For example, in the first configuration 104, the second housing 112 is covered by the first housing 110. Thus, the first and second housings 110, 112 are positioned in different planes, which may be defined using the outer surfaces of the housings.

In the second configuration 106, the first housing 110 that includes the display device 116 is slid "upward" in the illustration. Once the first housing 110 clears the second housing 112, e.g., is slid past the sound housing 112, the second housing 112 is raised until both the first and second housings 110, 112 reside along a substantially similar plane 120 defined by their respective outer surfaces. In this way, the outer surfaces of the keyboard 118 and the display device are moved closer together than in the first configuration 104. For instance, the outer surface of the display device 110 and the keyboard 118 (e.g., a "top" of the keys and/or the portion of the second housing 112 that contains the keys) may be substantially equal, such as separated by a distance approximately equal to or less than the height of the keys. A variety of different mechanisms may be employed to position the first and second housings 110, 112 in a substantially similar plane, an example of which may be found in relation to the following figure.

Figure 2A:
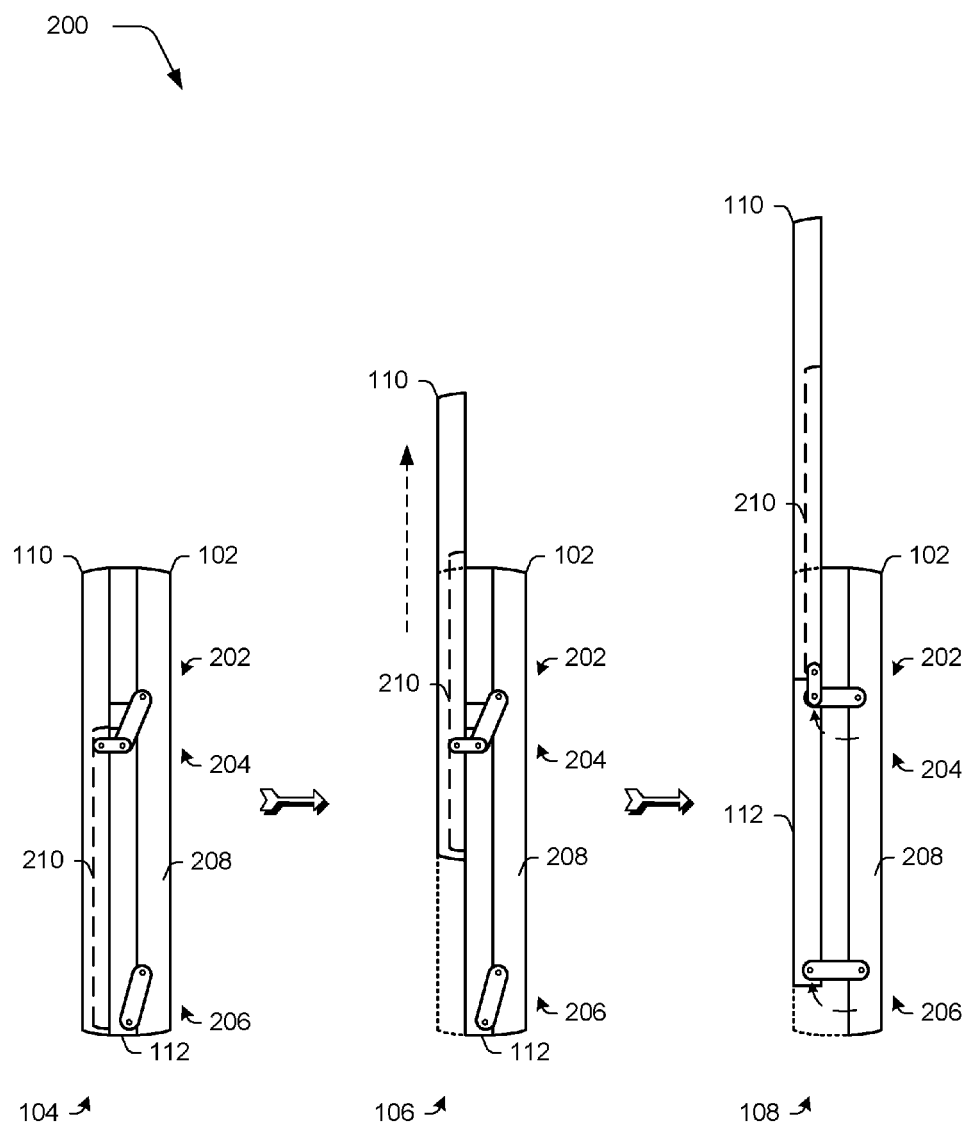
FIG. 2A is an illustration of an example embodiment showing a mobile communications device of FIG. 1 as employing a mechanism involving a linkage to raise a keyboard to be positioned along a substantially similar plane to that of a display device.

FIG. 2A depicts an example embodiment 200 showing the mobile communications device 102 of FIG. 1 as employing a mechanism involving a linkage to raise a keyboard to be positioned along a substantially similar plane to that of a display device. As before, the mobile communications device 102 is illustrated in the first, second, and third configurations 104, 106, 108.

In the first configuration, the mobile communications device 102 is arranged so that the first housing 110 covers the second housing 112. A mechanism 202 is also illustrated that includes first and second linkages 204, 206. The first linkage 204 is pivotably attached to the second housing 112 and to a third housing 208. In this example, the first and third housings 110, 208 at least partially surround and cover the second housing 112 when in the first configuration 104. The second linkage 206 is also pivotably attached to the second and third housings 112, 208.

The first linkage 204 also includes a member that is configured to slide along a channel 210 in the first housing 110. As shown in the second configuration 106, for instance, the first housing 110 is slid upward as indicated by the arrow. During this movement, the first linkage moves through the channel 210 in the first housing until reaching an end of the channel 210. At this point, as shown in the third configuration 108, the member of the first linkage 204 that slid through the channel 210 causes the second housing 110 to be raised by the first and second linkages 204, 206 by pivoting on the third housing 208. Thus, in this example, a top of the second housing 112 contacts a bottom of the first housing 110 such that the first housing 110 does not interfere with a user's interaction with the keyboard 118 of the second housing 112.

It should be readily apparent that this example implementation 200 employs but one of a variety of different mechanisms that may be utilized to position the first and second housings 110, 112 in a substantially similar plane. For example, a single pivot of the linkage may be attached between the sides of the second and third housings and used to pivot the keyboard upward. Another example is shown in the next figure.

Figure 2B:
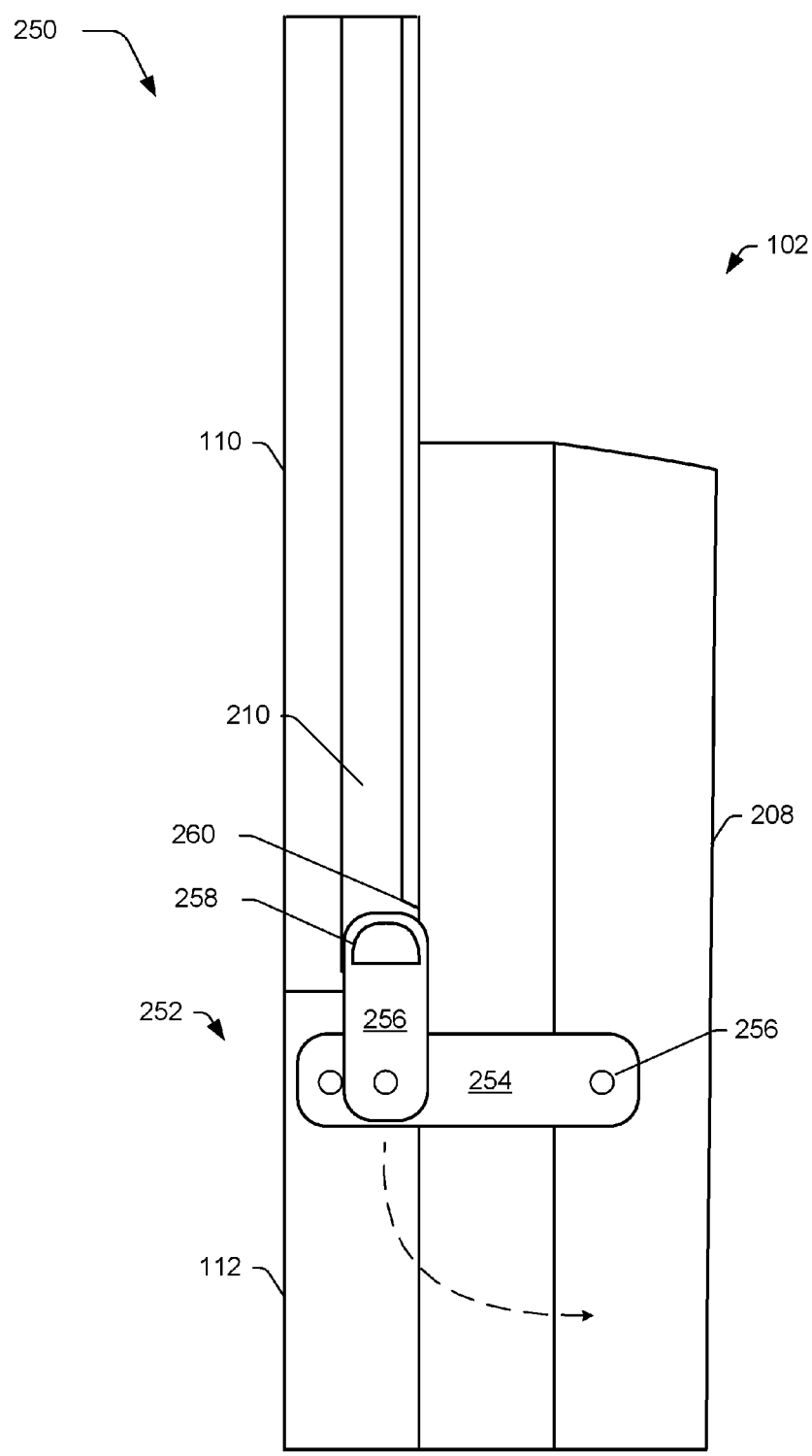
FIG. 2B is an illustration of another example embodiment showing a mobile communications device of FIG. 1 as employing another mechanism involving a linkage to raise a keyboard to be positioned along a substantially similar plane to that of a display device.

FIG. 2B is an illustration of another example embodiment 250 showing a mobile communications device of FIG. 1 as employing another mechanism involving a linkage to raise a keyboard to be positioned along a substantially similar plane to that of a display device. The first housing 110 having the display device 116, the second housing 112 having the keyboard 118, and the third housing 208 are coupled via a linkage 252.

The linkage 252 includes a connecting link 254 and an activating link 256. As arranged in the embodiment 250 of FIG. 2B, the first housing 110 and the activating link 256 move at the same speed as the first housing 110 slides. However, the second housing 112 having the keyboard 118 is attached to the end of the connecting link 254 moves faster than the first housing 110 having the display device 116. This is due to the distance from a pivot 256 of the connecting link, which is greater than a distance of the activating link 256 from the pivot 256. This allows the second housing 112 to move faster than the first housing 110, thereby "clearing the way" for the first housing 110 to slide over the second housing 112.

In the illustrated embodiment 250, the activating link 256 also includes a member 258 that is configured to engage a stopper 260, which is an edge of the channel 210 in the first housing 110 in this example. The stopper 260 is configured to prevent the sliding of the activating link 256 until the activating link 256 rotates approximately ninety degrees. This is due to engagement of the member 258 with the stopper 260 until the member 258 assumes an orientation that permits it to be slid through the channel 210. In this way, movement of the first housing 110 causes a force to be applied to the activating link 256, which in turn causes the connecting link 254 to pivot. This pivoting causes the second housing 112 to rotate "out of the way" to permit the first housing 110 to slide over the second housing 112. A variety of other examples are also contemplated, such as rearrangement of the connection points and pivots of the linkage 252 to achieve similar functionality.

Although FIGS. 1, 2A, and 2B illustrated movement of the second housing 112 into the plane of the first housing 110, a variety of other examples are also contemplated, an example of which may be found in relation to the following figure.

Figure 3:
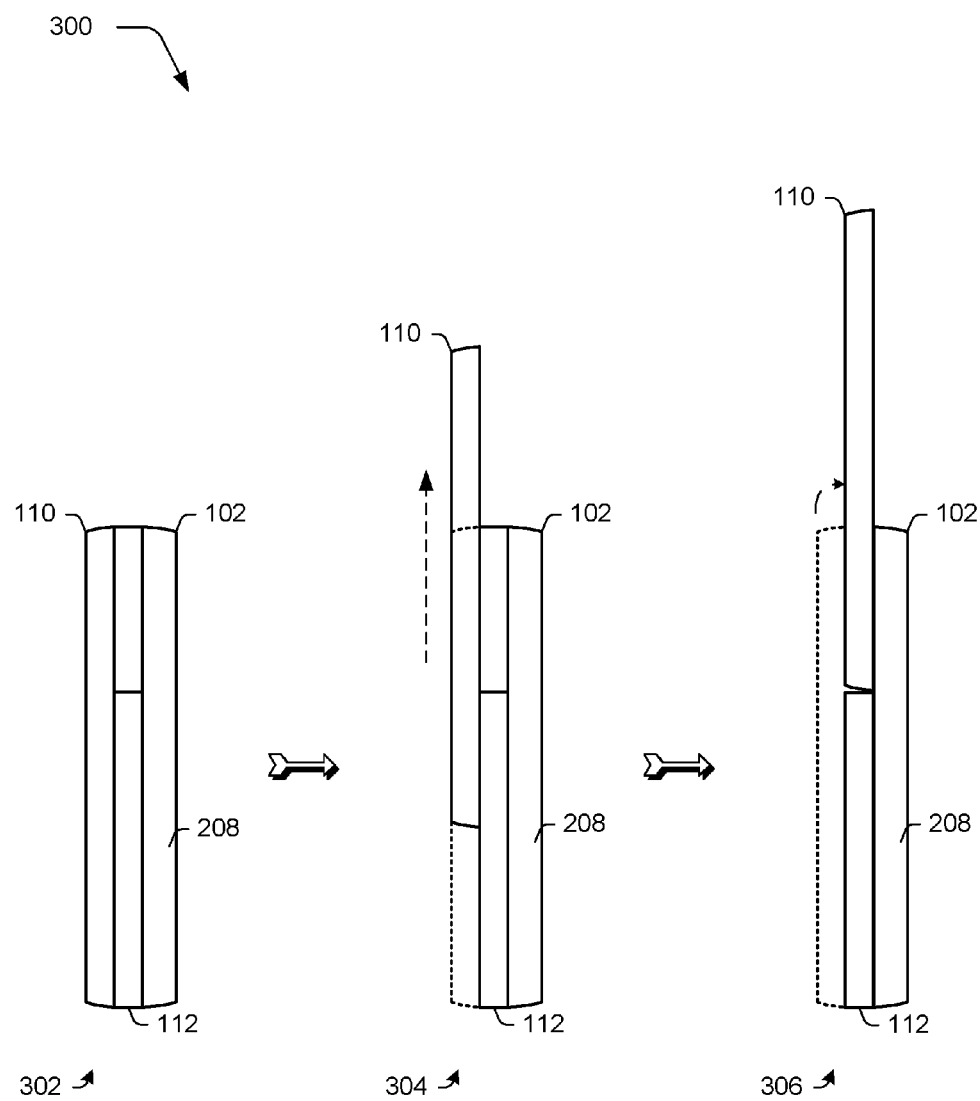
FIG. 3 is an illustration of an example embodiment showing a mobile communications device of FIG. 1 as using movement to position the first housing that includes a display device into a substantially similar plane as a second housing that include a keyboard.

FIG. 3 depicts an example embodiment 300 showing the mobile communications device 102 of FIG. 1 as using movement to position the first housing that includes a display device into a substantially similar plane as a second housing that include a keyboard. This example embodiment also shows first, second, and third configurations 302, 304, 306 of the mobile communications device 102.

In the first configuration 302, the mobile communications device 102 is arranged so that the first housing 110 and the third housing 208 covers and at least partially surrounds the second housing 112. In the second configuration 304, the first housing 110 that includes the display device 116 is slid to at least partially expose the keyboard 118 of the second housing 112.

In the third configuration 306, however, the first housing 110 is moved into a substantially similar plane to that of the second housing 112. For example, the first housing 110 may be pivoted, "dropped down," and so on such that the first and second housing 110, 112 are positioned along a matching plane. For instance, the outer surfaces of the display device 116 and the keyboard 118 may be positioned approximately at planes that are less than a height of the keys of the keyboard 118 less than a width of one or more of the housings, and so on to be closer to each other than in the first configuration 302. A variety of other examples are also contemplated, such as movement of both the first and second housings 110, 112 to meet at a substantially similar plane that is between their original positioning Additionally, although movement that involves sliding along a width of the mobile communications device 102 has been described, a variety of different movements are contemplated to position the first and second housing in substantially similar planes, further discussion of which may be found in relation to the following figure.

Figure 4:
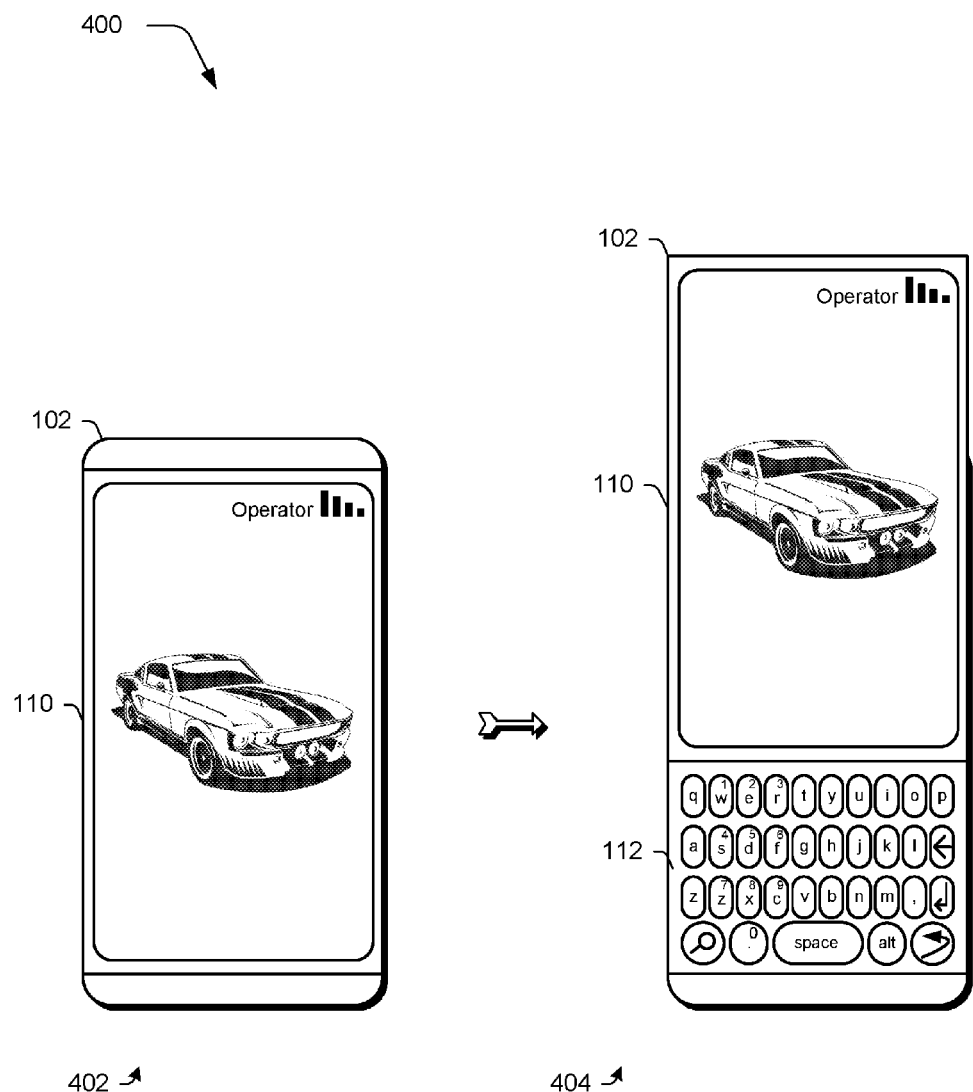
FIG. 4 depicts an example embodiment showing a mobile communications device as using movement along a height of device to position the first housing that includes a display device into a substantially similar plane as a second housing that includes a keyboard.

FIG. 4 depicts an example embodiment 400 showing a mobile communications device as using movement along a height of the device to position the first housing that includes a display device into a substantially similar plane as a second housing that includes a keyboard. In the previous implementations the first housing 110 slid along the width of the device. It should be also readily apparent that the movement may also be along the height of the device, as shown in the first and second configurations 402, 404 of FIG. 4. Additionally, although sliding movement has been described, a variety of different movements may be employed to position the first and second housings 110, 112 in substantially similar planes, an example of which may be found in relation to the following figure.

FIG. 5 is an illustration of an example implementation 500 of a mobile communications device 102 in accordance with one or more embodiments of devices, features, and systems for mobile communications. The mobile communications device 102 is illustrated as assuming a plurality of configurations, examples of which include a first configuration 502, a second configuration 504 and a third configuration 506 that are achieved through rotating one or both of the first or second housings 110, 112.

The first housing 110 and the second housing 112 are connected via a pivot 508 such that the first and second housings may rotate, one to another. As before, the first housing 110 includes a display device 116 (e.g., a touchscreen) that may be used to output a variety of data, such as a caller identification (ID), information related to text messages as illustrated, email, multimedia messages, Internet browsing, game play, music, video and so on. The second housing 112 is illustrated as including a keyboard 118 that may be used to provide inputs to the mobile communications device 102.

In the first configuration 502, the mobile communications device 102 is closed such that the first housing 110 covers the second housing 112. Consequently, the keyboard 118 disposed on the second housing 112 is covered and is not available to receive inputs from a user of the mobile communications device 102.

In the second configuration 504, the first housing 110 is rotated "away" from the second housing 112 using the pivot 508. Therefore, in the second configuration 504 at least a portion of the keyboard 118 disposed on the second housing 112 is exposed.

In the third configuration 506, the mobile communications device 102 is illustrated in both a front view and a side view. In this configuration, the first housing 110 has been rotated ninety degrees with respect to the second housing 112. At least a majority of the keys of the keyboard 118 is exposed such that the exposed keys are available to receive inputs from a user. Accordingly, this configuration may be considered an "open" configuration. As further shown in the third configuration 506, once the first housing 110 is rotated the ninety degrees, it may fit down into an indentation 510 in the second housing 112. For example, the pivot 508 may be biased through use of a spring to force the first and second housings 110, 112 together. This causes the first and second housings 110, 122 to be positioned along a substantially similar plane as shown in the side view of the third configuration 506. In the illustrated implementation 500, the display device 116 remains viewable by a user in the first, second, and third configurations 502, 504, 506.

Example Procedures

The following discussion describes mobile communications device techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the embodiments 200, 250, 300, 400, 500 of FIGS. 2-5, respectively.

Figure 6:
FIG. 6 is a flow diagram that depicts a procedure in an example implementation in which housings of a mobile communications device are moved to first and second configurations.

FIG. 6 is a flow diagram that depicts a procedure 600 in an example implementation in which housings of a mobile communications device are moved to first and second configurations. At least one of a first housing or a second housing of a mobile communications device is moved to assume a first configuration (block 602). For example, in the first configuration the display device is viewable and the keyboard is covered. The first housing includes a display device and the second housing includes a keyboard. Examples of the first configuration may be found in FIGS. 1, 4, and 5.

At least one of a first housing or a second housing of a mobile communications device is moved to assume a second configuration (block 604). For example, in the second configuration the keyboard is exposed and positioned such that an outer plane of the keyboard is positioned in a substantially similar plane to that of an outer surface of the display device and the display device is viewable. Examples of the second configuration may also be found in FIGS. 1, 4, and 5.

Example Device

Figure 7:
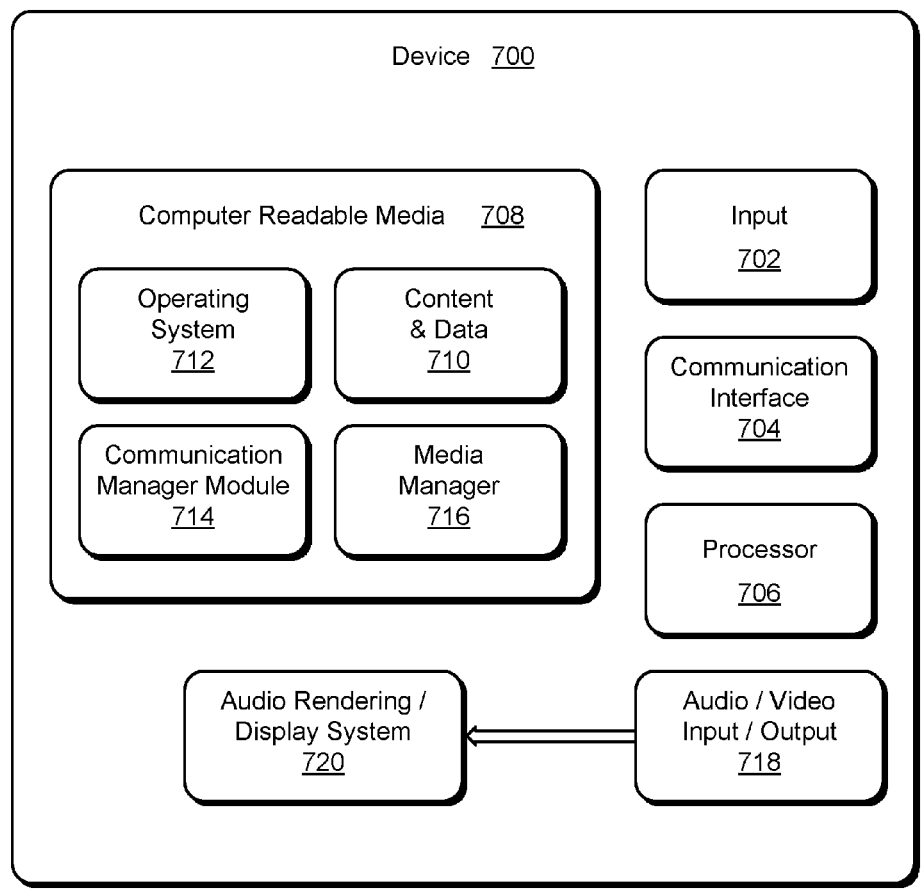
FIG. 7 is an illustration of various components of an example device that can be implemented in various embodiments as any type of a mobile communication device to implement embodiments of devices, features, and systems for mobile communications.

FIG. 7 illustrates various components of an example device 700 that can be implemented in various embodiments as any type of a mobile communication device to implement embodiments of devices, features, and systems for mobile communications. For example, device 700 can be implemented as any of the mobile communication devices 102 described with reference to respective FIGS. 1-5. Device 700 can also be implemented to access a network-based service, such as a content service.

Device 700 includes input(s) 702 that may include Internet Protocol (IP) inputs. Device 700 further includes communication interface(s) 704 that can be implemented as any one or more of a wireless interface, any type of network interface, and as any other type of communication interface. A network interface provides a connection between device 700 and a communication network by which other electronic and computing devices can communicate data with device 700. A wireless interface enables device 700 to operate as a mobile communication device for wireless communications.

Device 700 also includes one or more processors 706 (e.g., any of microprocessors, controllers, and the like) which process various computer-executable instructions to control the operation of device 700 and to communicate with other electronic devices. Device 700 can be implemented with computer-readable media 708, such as one or more memory components, examples of which include random access memory (RAM) and non-volatile memory (e.g., any one or more of a read-only memory (ROM), flash memory, EPROM, EEPROM, etc.).

Computer-readable media 708 provides data storage to store content and data 710, as well as device applications and any other types of information and/or data related to operational aspects of device 700. For example, an operating system 712 can be maintained as a computer application with the computer-readable media 708 and executed on processor(s) 706. Device applications can also include a communication manager module 714 (which may be used to provide telephonic functionality) and a media manager 716.

Device 700 also includes an audio and/or video output 718 that provides audio and/or video data to an audio rendering and/or display system 720. The audio rendering and/or display system 720 can be implemented as integrated component(s) of the example device 700, and can include any components that process, display, and/or otherwise render audio, video, and image data. Device 700 can also be implemented to provide a user tactile feedback, such as vibrate and haptics.

Generally, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices. The features of the techniques described above are platform-independent, meaning that the techniques may be implemented on a variety of commercial computing platforms having a variety of processors.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A mobile communications device comprising:
a first housing; and
a second housing that includes an indentation and is movably attached to the first housing by a pivot that is located at a fixed position relative to the first and second housings, the mobile communications device being moveable between:
a first configuration in which the first housing substantially covers the second housing so that an outer surface of the second housing is covered and an outer surface of the first housing is viewable; and
a second configuration in which said outer surface of the second housing is exposed and positioned along a plane with the outer surface of the first housing, the mobile communications device being moveable from the first configuration to the second configuration by rotating the first housing about the pivot and fitting the first housing into an indentation in the second housing.

2. A mobile communications device as described in claim 1, wherein in the first configuration the outer surface of the second housing is positioned along a plane that is different from the plane with the outer surface of the first housing.

3. A mobile communications device as described in claim 1, wherein the first housing is rotated away from the second housing by ninety degrees prior to fitting into the indentation of the second housing.

4. A mobile communications device as described in claim 1, wherein a bottom of the first housing contacts the outer surface of the second housing in the first configuration, the bottom of the first housing corresponding to a surface of the first housing opposite the outer surface of the first housing.

5. A mobile communications device as described in claim 1, wherein the outer surface of the first housing includes a display device.

6. A mobile communications device as described in claim 1, wherein the outer surface of the first housing includes a display device that is viewable in both the first and second configurations.

7. A mobile communications device as described in claim 1, wherein the outer surface of the second housing includes a keyboard having a plurality of keys arranged accordingly to a QWERTY configuration.

8. A mobile communications device as described in claim 1, further comprising one or more modules that are configured to provide telephonic functionality.

9. A mobile communications device as described in claim 1, further comprising one or more modules that are configured to provide telephonic functionality, wherein the one or more modules are configured to provide telephonic functionality in both the first configuration and in the second configuration.

10. A mobile communications device as described in claim 1, wherein the outer surface of the second housing includes an input device.

11. A mobile communications device as described in claim 1, wherein fitting the first housing into the indentation of the second housing is caused by a spring force of the pivot.

12. A method comprising:
orienting a mobile communications device in a first configuration, the mobile communications device including a first housing and a second housing that are moveably connected by a pivot having a fixed location relative to the first and second housings, the first configuration oriented such that an outer surface of the first housing is viewable and an outer surface of the second housing is covered by the first housing; and
orienting the mobile communications device in a second configuration by rotating at least one of the first housing or the second housing of the mobile communications device about the pivot and fitting the first housing into an indentation of the second housing, the second configuration oriented such that the outer surface of the second housing is exposed and positioned along a plane with the outer surface of the first housing.

13. The method of claim 12, wherein rotating at least one of the first housing or the second housing comprises rotating the housing about the pivot by ninety degrees.

14. The method of claim 12, wherein the outer surface of the first housing includes a display device and the display device is viewable in both the first and second configurations.

15. The method of claim 12, wherein the outer surface of the first hosing includes a display device, the method further comprising rotating a display of the display device in response to rotating at least one of the first housing or the second housing about the pivot to the second configuration.

16. The method of claim 12, wherein the outer surface of the second housing is positioned along a plane that is different from the plane with the outer surface of the first housing.

17. The method of claim 12, further comprising providing telephonic functionality, by the mobile communications device, in both the first configuration and in the second configuration.

18. The method of claim 12, wherein a bottom of the first housing contacts the outer surface of the second housing in the first configuration, the bottom of the first housing corresponding to a surface of the first housing opposite the outer surface of the first housing.

19. The method of claim 12, wherein the outer surface of the second housing includes an input device.

20. The method of claim 12, wherein fitting the first housing into the indentation of the second housing is caused by a spring force of the pivot.

* * * * *